United States Patent Office 3,491,093
Patented Jan. 20, 1970

3,491,093
DERIVATIVES OF 5 AMINOMETHYL-4,5,6,7-TETRAHYDRO-4-OXOINDOLES
Irwin J. Pachter, Woodbury, and Karl Schoen, Kew Gardens, N.Y., assignors to Endo Laboratories Inc., Garden City, N.Y., a corporation of New York
No Drawing. Filed Nov. 29, 1967, Ser. No. 686,777
Int. Cl. C07c 27/56; A61k 27/00
U.S. Cl. 260—247.5                                    11 Claims

ABSTRACT OF THE DISCLOSURE

Novel N-substituted 5-aminomethyl-4,5,6,7-tetrahydro-4-oxoindoles and the acid addition salts thereof are prepared by the Mannich condensation of the desired 4,5,6,7-tetrahydro-4-oxoindoles with formaldehyde and the requisite amines.

These novel compounds have pharmacological activity as sedatives and tranquilizers.

RELATED APPLICATIONS

This application is a continuation-in-part of applicants' copending application Ser. No. 357,284, filed Apr. 3, 1964 now abandoned. Intermediates utilized in the preparation of the novel compounds of this invention are disclosed in our application Ser. No. 348,878, filed Mar. 2, 1964, now abandoned, and in continuation-in-part thereof, Ser. No. 549,135 filed May 11, 1966.

FIELD OF THE INVENTION

The present invention relates to novel compounds having psychopharmacological effects, in particular activity as antipsychotics.

DESCRIPTION OF THE PRIOR ART

Heretofore compounds of the N-substituted-5-aminomethyl-4,5,6,7-tetrahydro-4-oxoindole series have not been described.

SUMMARY

The compounds of the present invention have the following general structural formula

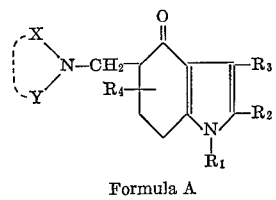

Formula A and the acid addition salts thereof.
In Formula A, the substituents have the following significance:

$R_1$ designates hydrogen, a lower alkyl having a maximum of 4 carbon atoms, benzyl, phenyl or 2-, 3-, or 4-pyridyl;
$R_2$ and $R_3$ designate alkyl, alkenyl and cycloalkyl each having a maximum of 8 carbon atoms, phenyl, halogeno-phenyl or lower alkoxy phenyl;
$R_4$ designates hydrogen or a lower alkyl having a maximum of 4 carbon atoms and being attached to carbon atom 6 or 7 of the indole nucleus;
X and Y designate lower alkyl, hydroxy lower alkyl, lower acyloxy alkyl, carbamoyloxy lower alkyl and phenyl lower alkyl;
X and Y may be linked together and then constitute, together with a nitrogen atom, a heterocyclic ring having a maximum of 8 members.

A typical process for preparing the 5-aminomethyl-4,5,6,7-tetrahydro-4-oxoindoles of this invention is the Mannich reaction, which can be illustrated by the following reaction scheme:

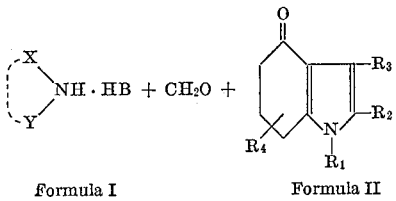

Formula I          Formula II

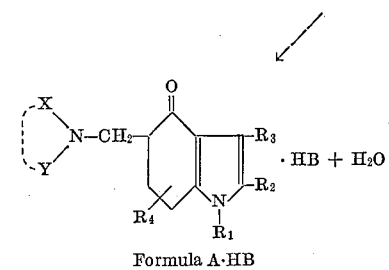

Formula A·HB

The most general method of preparing those intermediates is by the reduction of an α-oximinoketone in the presence of a cyclohexane-1,3-dione.
Condensation occurs during the reduction process to provide the final products.

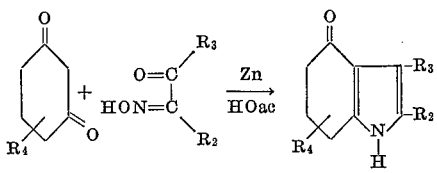

N-alkyl and N-benzyl intermediates may be prepared from the 4,5,6,7-tetrahydro-4-oxoindoles by treatment with an alkali metal which results in the formation of the alkali metal derivative, followed by the interaction of the alkali metal derivative with an N-alkylating or N-benzylating agent such as alkyl (or benzyl) halide or sulfate ($R_1B$(B designating the halogeno- or sulfato-moiety) to produce the desired product, as illustrated in the following reaction scheme:

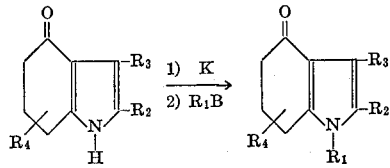

Treatment with potassium metal affords a potassium derivative which then reacts with an alkyl halide or sulfate ($R_1B$) to produce the desired product.

As an alternate route to the synthesis of the 4,5,6,7-tetrahydro-4-oxoindole intermediates, one may use the method of H. Stetter and R. Lauterbach, Ann., 655, 20 (1962) in which ammonia or a primary amine is condensed with a derivative of 4,5,6,7-tetrahydro-4-oxobenzofuran.

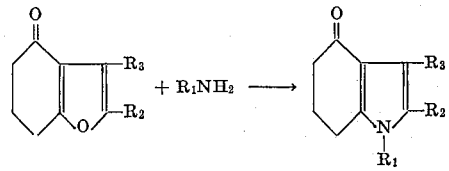

In the preparation of the compounds of this invention by this method, an amine salt is generally used, although the corresponding free base can, at times, be employed.

The amine salt is formed from the amine and an acid, HB, which may be inorganic or organic.

PHARMACOLOGICAL ACTIVITY

The compounds of the foregoing Formula A have central nervous system activity, and are useful as tranquilizers and sedatives. Many of the 4,5,6,7-tetrahydro-4-oxoindole intermediates are themselves useful psychotherapeutic drugs with pronounced sedative effects. It was discovered unexpectedly, however, that the 5-aminomethyl-4,5,6,7-tetrahydro-4-oxoindoles of this invention are not only useful sedatives but, in addition, they are particularly valuable as ataractics and tranquilizers, as well as analgetics and anti-emetics.

The sedative and tranquilizing effects of the compounds of this invention are readily ascertained by comparing them with a reference compound, such as chlorpromazine. Preliminary determinations were carried on in the laboratory as follows:

SEDATION

This effect is determined by measurement of locomotor activity of mice following intraperitoneal administration of the test compound. In each test a group of three mice is placed in a round cylinder criss-crossed by six photoelectric beams (Actophotometer Metro). A counter registers each time that a mouse moves and interrupts a beam. The dosage which produces 50% reduction of activity as compared with saline controls is determined, the activity being measured for 30 minutes, starting 15 minutes after injection.

TRANQUILIZATION

This effect is measured by the inhibition of conditioned avoidance response in rats. In this test rats are trained to jump to a wooden pole at the sound of a buzzer in order to avoid a mild electric shock from a metal floor. The tranquilizer effect of the test compound is measured by the ability of the compound to inhibit such response. See the method of L. Cook and E. Weidley; Annals of New York Academy of Sciences, vol. 66, page 740, 1957.

It has been found that all of the compounds of general Formula A or the acid salts thereof specifically exemplified hereinbelow exhibit sedative or tranquilizing activity.

Moreover, it has been found that particularly good sedation (and tranquilization) are produced when the unit

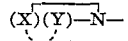

in Formula A is dimethylamino, piperazino

or morpholino and 4-methyl-piperidino. When $R_3$ in Formula A is alkyl, sedation and tranquilization effects are increased as the alkyl increases in size from methyl to butyl.

In particular, it has been found that 3-ethyl-6,7-dihydro-2-methyl-5-(morpholinomethyl)indol-4(5H)-one hydrochloride another name for 2-methyl-3-ethyl-4,5,6,7-tetrahydro-5-morpholinomethyl-4-oxoindole, now specifically designated as molindone, exhibits neuroleptic and anti-depressant properties not only in test animals but in humans as well.

Some neuroleptic effects of molindone in mice include suppression of locomotor activity, of conditioned avoidance behavior and of amphetamine-induced stereotypy, but at oral doses 3 to 6 times those of chlorpromazine (CPZ). In rats, under similar experimental conditions molindone hydrochloride is about 2 to 3 times more potent than CPZ. In dogs, it is about twice as potent as CPZ in reducing wakefulness and arousal (threshold dose, 1 mg./kg., p.o.) but much more potent as an anti-emetic. In Rhesus monkeys, molindone hydrochloride curtails aggressiveness at <1 mg./kg., p.o. Some anti-depressive properties are antagonism of tetrabenazine ptosis and potentiation of certain DOPA and 5-HTP effects. Although the latter are typical MAOI effects, molindone hydrochloride hardly affected rat brain monoamine oxidase activity in vitro ($Xi = 1.0 \times 10^{-3}$ M). Molindone hydrochloride is also antinociceptive by the oral route inhibiting phenylquinone writing (ED50's are 15 mg./kg. in mice and 14 mg./kg. in rats) and increasing hot-plate reaction time (ED50's are 8 mg./kg. in mice and 28 mg./kg. in rats). Oral LD50's for mice and rats are 670 and 261 mg./kg., respectively. (See: Rubin et al., Fed. Proc. 26, 738 (1967), Schoen et al. Chem. and Eng. News, Apr. 24, 1967, p. 53.)

In the first clinical pharmacological trial of molindone, it was given to 11 chronic schizophrenic men in doses increasing from 5 to 200 mg. daily. The maximum period of administration was 13 weeks. Independent global ratings of clinical change by two investigators showed some improvement in at least seven patients. Behavioral rating scales showed most improvement in the second month of therapy, at a dose level of 50 to 125 mg. daily; especially notable were improvements in disorientation, thinking and perceptual distortion, schizophrenic disorganization, and social competence. Unusual euphoria was also observed. Improvement in appetite and gain in weight occurred late in the study. (See Sugarmann and Herrmann, Chem. Pharm. Ther. 8: 261–65, 1967).

PREFERRED EMBODIMENTS

In the preferred modification of this invention, the preferred substituents in the compound of Formula A, shown hereinabove, are as follows: $R_1$ is hydrogen, lower alkyl such as methyl, ethyl, propyl, isopropyl or butyl, benzyl, phenyl or 2-, 3- or 4-pyridyl.

$R_2$ and $R_3$ are lower alkyl, such as ethyl, methyl, propyl, isopropyl, butyl, pentyl, or hexyl; lower alkenyl such as vinyl, allyl, methallyl, dimethallyl, butenyl, pentenyl, or hexenyl; or cyclolower alkyl, for example, cyclopropyl, cyclopentyl, or cyclohexyl; phenyl, halophenyl such as chlorophenyl or bromophenyl, or lower alkoxyphenyl wherein the lower alkoxy group may be methoxy, ethoxy, propoxy, or butoxy.

$R_4$ is hydrogen or lower alkyl wherein the lower alkyl has a value similar to that of $R_1$.

The substituents of the amino-methyl moiety, designated X and Y, when not joined to each other, are lower alkyl, such as methyl, ethyl, propyl or butyl; or hydroxy lower alkyl, carbamoyloxy lower alkyl, phenyl lower alkyl, or lower alkanoyloxy lower alkyl, wherein the lower alkyl moiety has the same significance as in the unsubstituted lower alkyl moiety, and lower alkanoyloxy signifies formyloxy, acetoxy, propionoxy, butyroxy, valeroxy, and hexanoyloxy.

Where X and Y are linked together as well as being each bonded to the nitrogen of the aminomethyl moiety, the heterocyclic ring moiety formed thereby is, preferably, piperidino, (lower alkyl)-piperidino, di(lower alkyl)-piperidino, (lower alkoxy)-piperidino, hydroxypiperidino, (lower alkanoyloxy-piperidino, pyrrolidino, (lower alkoxy)-pyrrolidino, (lower alkyl) - pyrrolidino hydroxy-pyrrolidino, morpholino, (lower alkyl)-morpholino, di(lower alkyl)-morpholino, (lower alkoxy)-morpholino, thiomorpholino (lower alkyl)-thiomorpholino, di(lower alkyl)-thiomorpholino, (lower alkoxy)-thiomorpholino, piperazino, (lower alkyl)-piperazino, di(lower alkyl)-piperazino, (lower alkoxy)-piperazino, phenyl-piperazino, hydroxyalkyl-piperazino, lower alkanoyloxy-lower alkyl-piperazino and carbamoyloxy-lower alkyl-piperazino.

The terms "lower alkanoyl," "lower alkyl" and "lower alkoxy" designate both straight and branched chain radicals having a maximum of 5 carbon atoms.

The preferred acids useful for preparing the acid addition salts include inorganic acids, such as hydrochloric, hydrobromic, sulfuric, nitric, phosphoric and perchloric, as well as organic acids such as oxalic, tartaric, citric, acetic, succinic, and maleic and ethanedisulfonic acids.

In the preferred modification of the Mannich condensation reaction, the oxoindole moiety and a large excess of the amine and the formaldehyde are taken up in a suitable solvent. It is preferred to use a molar excess of from about 25 to about 50 moles percent of amine and of formaldehyde. The formaldehyde may be employed either in the form of paraformaldehyde or in the form of an aqueous solution, the former usually being preferred for ease of handling.

Solvents suitable for carrying out the reaction include water, aqueous or glacial acetic acid, Cellosolve (viz 2-ethoxyethanol), or lower alkanols such as methanol, propanol or butanol. However, the lower alkanols such as methanol or ethanol are generally preferred for reasons of cost and ease of handling.

The reaction may be carried out at any temperature above about 0° C., up to the reflux temperature of the solvent chosen. While a certain amount of heating is advantageous since it accelerates the rate at which the reaction proceeds, the quality of the reaction product is sometimes adversely affected by prolonged heating at high temperatures, for example, above about 80° C. Although the amine may be used in this reaction in the form of its free base, it is generally preferred to utilize the amine in the form of an acid salt. Any readily available acid moiety may be used, both inorganic and organic acids being suitable. Generally, the hydrochloride is preferred, since it is usually the most generally available form of an amine acid salt.

In order to reduce undesirable side reactions, particularly where the reaction is carried out at elevated temperatures, it is preferred to carry out the condensation in an inert atmosphere, suitably a nitrogen atmosphere.

Where the reaction is carried out using the amine in the form of the hydrochloride and the formaldehyde in the form of paraformaldehyde in a lower alkanol solution, the reaction is usually complete after heating under reflux for about 2 to about 4 days to yield the Mannich condensate in the form of the hydrochloride.

Where it is desired to produce the free base, the hydrochloride salt is taken up in the minimum amount of water, aqueous ammonia added thereto and the base extracted with a suitable water immiscible solvent such as ether. Evaporation of the ether yields the free base which may then be recrystallized with any suitable solvent. Among the solvents preferred for recrystallization of the free bases are benzene, benzene in the presence of petroleum ether, and isopropanol.

Where it is desired to produce acid salts other than the hydrochloride, the purified free base is treated with an aqueous solution containing a predetermined amount of the requisite acid, and the solution concentrated in vacuo. To this concentrated solution there is added ethanol and, if required, acetone, and the mixture allowed to stand in a refrigerator until the salt crystallizes out. The salt may then be purified by recrystallization from any suitable solvent.

The 4,5,6,7-tetrahydro-4-oxoindole intermediates used in the foregoing reaction are prepared, for the most part, as described in our copending application, Ser. No. 348,878, filed Mar. 2, 1964, now abandoned.

The foregoing descriptions and the following examples are exemplary of the scope and procedures of this invention.

All temperatures herein are given in ° C.

EXAMPLE 1

4,5,6,7-tetrahydro-2,3-dimethyl-5-piperidinomethyl-4-oxoindole 16.3 gm. 4,5,6,7-tetrahydro-2,3-dimethyl-4-oxoindole (0.10 mole) were heated to reflux with 10.7 gm. piperidine hydrochloride (0.10 mole) and 4.5 gm. paraformaldehyde (0.15 mole) in 250 ml. ethanol. After 8 hours, another 1 gm. paraformaldehyde was added and refluxing continued for a total of 48 hours. The solution was evaporated to dryness in vacuo on a steam bath, the residue taken up in 150 ml. water to which 10 ml. 2 N hydrochloric acid had been added and the solution freed from an insoluble residue (unchanged starting material) by filtration. The filtrate was made alkaline with ammonia water whereupon a white solid precipitated. This was filtered, washed with water, dried at 80° and crystallized several times from benzene followed by crystallization from benzene-heptane. M.P. 179°, sinters at 174°. The melting point depends on the rate of heating.

The hydrochloride was prepared by dissolving the base in the necessary amount of dilute HCl to give pH 4.0, concentrating the solution in vacuo to a small volume and adding an equal volume of anhydrous ethanol and 5 volumes acetone. The salt crystallized on standing in the refrigerator for 24 hours. It was recrystallized from anhydrous ethanol and acetone and crystallizes as the alcoholate of the formula $C_{16}H_{24}N_2O.HCl.C_2H_5OH$ M.P. 202–204° (decomposition).

EXAMPLE 2

4,5,6,7-tetrahydro-2,3-dimethyl-5-dimethylaminomethyl-4-oxoindole hydrochloride 4,5,6,7-tetrahydro-2,3-dimethyl-4-oxoindole 16.3 gm. (0.10 mole), 8.15 gm. dimethylamine hydrochloride (0.10 mole), and 4.5 gm. paraformaldehyde (0.15 mole) were refluxed in 250 ml. ethanol. After 8 hours, added 1 gm. paraformaldehyde and after 24 hours another 1 gm. After refluxing for a total of 48 hours, 120 ml. ethanol were distilled off. On standing at room temperature over night, colorless needles crystallized out. These were filtered off, washed with ethanol and recrystallized to a constant melting point of 230° from 90% aqueous ethanol.

EXAMPLE 3

4,5,6,7-tetrahydro-2,3-dimethyl-5-(N'-hydroxyethylpiperazino)-methyl-4-oxoindole dihydrochloride 4,5,6,7-tetrahydro-2,3-dimethyl-4-oxoindole 16.3 gm. (0.10 mole), 25 gm. N-hydroxyethylpiperazine hydrochloride (0.15 mole), and 4.5 gm. paraformaldehyde (0.15 mole) were refluxed in 250 ml. anhydrous ethanol. After 12 hours a precipitate had formed and the mixture bumped badly; 20 ml. water were added in order to get a clear solution. Refluxing was continued for a total of 40 hours. The solution was evaporated in vacuo on the steam bath. A resinous residue remained which could not be brought to crystallization. It was taken up in anhydrous ethanol and an alcoholic solution of HCl added to form a hydrochloride which was practically insoluble in ethanol. It was filtered, washed with ethanol, suspended in boiling ethanol and dissolved by adding a few drops of water. To the solution was added 4 volumes acetone and the mixture kept in a deep freeze cabinet at −18° for 3 days. The dihydrochloride crystallized as colorless crystals which were filtered off, washed with acetone and dried. For assay, the compound was dried 12 hours at 110° and 0.5 mm. It gradually darkens and softens above 200° and melts at 215°.

EXAMPLE 4

4,5,6,7-tetrahydro-2,3-dimethyl-5-(4-methylpiperidino)methyl-4-oxoindole 4,5,6,7-tetrahydro-2,3-dimethyl-4 - oxoindole 16.3 gm. (0.10 mole), 20.3 gm. 4-methylpiperidine hydrochloride (0.15 mole), and 4.5 gm. paraformaldehyde (0.15 mole) were refluxed in 250 ml. ethanol. After 20 hours, 3 ml. of 35% formaldehyde solution was added and refluxing continued for a total of 40 hours. The solution was evaporated to dryness in vacuo on a steam bath. On standing for one day at room temperature, the residue crystallized. It was refluxed with 200 ml. acetone which dissolved the main portion and left an insoluble residue. The latter was crystallized from ethanol-acetone; it was a hydrochloride; M.P. 160–162°, yield 2 gm.

The acetone solution was evaporated to dryness in vacuo and the residue digested with 150 ml. water. A water-insoluble material (5 gm. unchanged starting material) formed which was filtered from the dark red aqueous solution. To the latter, ammonia water was added and a resinous precipitate formed. The aqueous layer was decanted and the resin treated with a small volume of ether which caused it to turn into a solid. This was crystallized twice from benzene, twice from benzene-heptane and again from benzene. Yellow crystals, M.P. 154–157°, yield 3.5 gm. pure material.

EXAMPLE 5

4,5,6,7-tetrahydro-2,3-dimethyl-5-(2-methylpiperidino)-methyl-4-oxoindole 4,5,6,7-tetrahydro-2,3-dimethyl-4 - oxoindole 16.3 gm. (0.10 mole), 20.3 gm. 2-methylpiperidine hydrochloride (0.15 mole), and 4.5 gm. paraformaldehyde (0.15 mole) were refluxed with 250 ml. ethanol. After 20 hours, 1 gm. paraformaldehyde was added and refluxing continued for a total of 48 hours. The solution was evaporated to dryness in vacuo, the residue digested with a mixture of 150 ml. water and 10 ml. 2 N HCl and filtered from unreacted material (12 gm.). The latter was again refluxed with 16 gm. 2-methyl-piperidine hydrochloride and 3 gm. paraformaldehyde and worked up as before.

The combined acid solutions were made alkaline with ammonia water. A resinous precipitate formed which turned into a solid when digested with a small volume of ether. The solid was twice crystallized from benzene, then twice from isopropanol, M.P. 155–160°.

EXAMPLE 6

3-ethyl-4,5,6,7-tetrahydro-2-methyl-5-dimethylaminomethyl-4-oxoindole 3-ethyl-4,5,6,7-tetrahydro-2-methyl - 4 - oxoindole 14.1 gm. (0.08 mole), 9.8 gm. dimethylamine hydrochloride (0.12 mole), and 3.6 gm. paraformaldehyde (0.12 mole) were refluxed in 200 ml. ethanol for 40 hours. The solution was evaporated to dryness in vacuo on a steam bath and the residue digested with a mixture of 150 ml. water and 10 ml. 2 N HCl. An insoluble residue of unreacted starting material was filtered off. To the acid solution, ammonia water was added dropwise with stirring and the amine crystallized out. It was purified by dissolving in 1 N HCl and addition of ammonia, then by 3 crystallizations from benzene, M.P. 170–175°.

EXAMPLE 7

3-ethyl-4,5,6,7-tetrahydro-2-methyl-5-morpholinomethyl-4-oxoindole 3-ethyl-4,5,6,7-tetrahydro-2-methyl - 4 - oxoindole 14.1 gm. (0.08 mole), 14.8 gm. morpholine hydrochloride (0.12 mole), and 3.6 gm. paraformaldehyde (0.12 mole) were refluxed in 200 ml. ethanol for 40 hours. The solution was evaporated to dryness in vacuo on a steam bath and the residue digested with a mixture of 150 ml. water and 10 ml. 2 N HCl. An insoluble residue of unreacted starting material was filtered off. To the acid solution, ammonia water was added dropwise with stirring and the amine crystallized out. It was purified by dissolving in 1 N HCl and addition of ammonia, then by 2 crystallizations from benzene followed by 2 crystallizations from isopropanol, to yield 3-ethyl-4,5,6,7-tetrahydro-2-methyl-5-morpholino-methyl-4-oxoindole, M.P. 180–181°.

EXAMPLE 8

3-ethyl-4,5,6,7-tetrahydro-2-methyl-5-piperidinomethyl-4-oxoindole

This compound was prepared in accordance with the method described in Example 6 from 3-ethyl-4,5,6,7-tetrahydro-2-methyl - 4 - oxoindole, piperidine hydrochloride, and paraformaldehyde. The amine precipitated in resinous form and solidified on standing. After repeated crystallizations from benzene, it formed yellow crystals, M.P. 148–151°.

EXAMPLE 9

3-ethyl-4,5,6,7-tetrahydro-2-methyl-5-diethylaminomethyl-4-oxoindole

This compound was prepared in accordance with the method described in Example 6 from 3-ethyl-4,5,6,7-tetrahydro-2-methyl-4-oxoindole, diethylamine hydrochloride, and paraformaldehyde. After crystallization from benzene-heptane and benzene, it melts, 139–140°.

EXAMPLE 10

3-ethyl-4,5,6,7-tetrahydro-2-methyl-5-dibutylaminomethyl-4-oxoindole

This compound was prepared in accordance with the method described in Example 6 from 3-ethyl-4,5,6,7-tetrahydro-2-methyl-4-oxoindole, dibutylamine hydrochloride, and paraformaldehyde. It was twice crystallized from benzene, then twice from isopropanol, M.P. 159–163°.

EXAMPLE 11

3-ethyl-4,5,6,7-tetrahydro-2-methyl-5-(4-methyl-piperidino)-methyl-4-oxoindole

This compound was prepared in accordance with the method described in Example 6 from 3-ethyl-4,5,6,7-tetrahydro-2-methyl-4-oxoindole, 4 - methylpiperidine hydrochloride, and paraformaldehyde. It was twice crystallized from benzene, then twice from isopropanol, M.P. 159–163°.

EXAMPLE 12

3-ethyl-4,5,6,7-tetrahydro-2-methyl-5-pyrrolidinomethyl-4-oxoindole

This compound was prepared in accordance with the method described in Example 6 from 3-ethyl-4,5,6,7-tetrahydro-2-methyl-4-oxoindole, pyrrolidine hydrochloride, and paraformaldehyde. The amine was crystallized twice from benzene in a nitrogen atmosphere, then twice from isopropanol, M.P. 165–168° (decomposition).

EXAMPLE 13

3-butyl-4,5,6,7-tetrahydro-2-methyl-5-dimethylaminomethyl-4-oxoindole

This compound was prepared in accordance with the method described in Example 6 from 3-butyl-4,5,6,7-tetrahydro-2-methyl-4-oxoindole, dimethylamine hydrochloride, and paraformaldehyde, M.P. 132–132°.

EXAMPLE 14

3-butyl-4,5,6,7-tetrahydro-2-methyl-5-piperidinomethyl-4-oxoindole

This compound is prepared in accordance with the method described in Example 6 from 3-butyl-4,5,6,7-tetrahydro-2-methyl-4-oxoindole, piperidine hydrochloride, and paraformaldehyde.

EXAMPLE 15

3-amyl-4,5,6,7-tetrahydro-2-methyl-5-dimethylaminomethyl-4-oxoindole

This compound was prepared in accordance with the method described in Example 6 from 3-amyl-4,5,6,7-tetrahydro-2-methyl-4-oxoindole, dimethylamine hydrochloride, and paraformaldehyde, M.P. 119°. The hydrochloride crystallizes from water as monohydrate, M.P. 186.5–187.5°.

EXAMPLE 16

3-amyl-4,5,6,7-tetrahydro-2-methyl-5-piperidinomethyl-4-oxindole

This compound is prepared in accordance with the method described in Example 6 from 3-amyl-4,5,6,7-tetrahydro-2-methyl-4-oxoindole, piperidine hydrochloride, and paraformaldehyde.

EXAMPLE 17

4,5,6,7-tetrahydro-2-methyl-5-dimethylaminomethyl-4-oxo-3-propylindole

This compound was prepared in accordance with the method described in Example 6 from 4,5,6,7-tetrahydro-2-methyl-4-oxo-3-propylindole, dimethylamine hydrochloride, and aqueous formaldehyde, M.P. 150°.

EXAMPLE 18

4,5,6,7-tetrahydro-2-methyl-5-piperidinomethyl-4-oxo-3-propylindole

This compound was prepared in accordance with the method described in Example 6 from 4,5,6,7-tetrahydro-2-methyl-4-oxo-3-propylindole, piperidine hydrochloride, and aqueous formaldehyde, M.P. 162–164°.

EXAMPLE 19

4,5,6,7-tetrahydro-2-methyl-5-dimethylaminomethyl-4-oxo-3-isopropylindole

This compound is prepared in accordance with the method described in Example 6 from 4,5,6,7-tetrahydro-2-methyl-4-oxo-3-isopropylindole, dimethylamine hydrochloride, and paraformaldehyde.

EXAMPLE 20

4,5,6,7-tetrahydro-2-methyl-5-piperidinomethyl-4-oxo-3-isopropylindole

This compound is prepared in accordance with the method described in Example 6 from 4,5,6,7-tetrahydro-2-methyl-4-oxo-3-isopropylindole, piperidine hydrochloride, and paraformaldehyde.

EXAMPLE 21

4,5,6,7-tetrahydro-2-methyl-5-dimethylaminomethyl-4-oxo-3-phenylindole

Isonitrosopropiophenone 32.6 g. (0.2 mole) and 22.4 g. 1,3-cyclohexane-dione (0.2 mole) were dissolved in 250 ml. acetic acid with stirring and 30 g. zinc dust added in small portions. After the strong exothermic reaction was over, the mixture was refluxed 30 minutes, poured on ice, the precipitate filtered off and crystallized repeatedly from acetic acid. 4,5,6,7-tetrahydro-2-methyl-4-oxo-3-phenylindole, M.P. 260–261.5° was obtained.

Condensation of this product with dimethylamine hydrochloride and paraformaldehyde is carried out by the method described in Example 6 and gives 4,5,6,7-tetrahydro - 2 - methyl-5-dimehylaminomethyl-4-oxo-3-phenylindole, M.P. 182–183° (decomposition).

EXAMPLE 22

4,5,6,7-tetrahydro-2-methyl-5-piperidinomethyl-4-oxo-3-phenylindole

This compound is prepared in accordance with the method described in Example 21 from 4,5,6,7-tetrahydro-2-methyl-4-oxo-3-phenylindole, piperidine hydrochloride, and paraformaldehyde.

EXAMPLE 23

4,5,6,7-tetrahydro-5-dimethylaminomethyl-4-oxo-2,3-diphenylindole

Reduction of equimolar amounts of benzil anti-monoxime and 1,3-cyclohexanedione with zinc in acetic acid by the method described in Example 21 gave 4,5,6,7-tetrahydro-4-oxo-2,3-diphenylindole, M.P. 304–307° (decomposition).

Reaction of the latter with dimethylamine hydrochloride and paraformaldehyde by the method described in Example 6 gave 4,5,6,7-tetrahydro-5-dimethylaminomethyl-4-oxo-2,3-diphenylindole, M.P. 142–146°.

EXAMPLE 24

4,5,6,7-tetrahydro-5-piperidinomethyl-4-oxo-2,3-diphenylindole

This compound is prepared in accordance with the method described in Example 6 from 4,5,6,7-tetrahydro-4-oxo-2,3-diphenylindole, piperidine hydrochloride, and paraformaldehyde.

EXAMPLE 25

4,5,6,7-tetrahydro-1,2,3-trimethyl-5-dimethylaminomethyl-4-oxoindole

This compound is prepared in accordance with the method described in Example 6 from 4,5,6,7-tetrahydro-1,2,3-trimethyl-4-oxoindole, dimethylamine hydrochloride, and aqueous formaldehyde solution.

EXAMPLE 26

4,5,6,7-tetrahydro-1,2,3-trimethyl-5-Piperidinomethyl-4-oroindole

This compound is prepared in accordance with the method described in Example 6 from 4,5,6-7-tetrahydro-1,2,3-trimethyl-4-oxoindole, piperidine hydrochloride, and aqueous formaldehyde solution.

EXAMPLE 27

3-ethyl-4,5,6,7-tetrahydro-1,2-dimethyl-5-dimethylaminomethyl-4-oxoindole

This compoond is prepared in accordance with the method described in Example 6 from 3-ethyl-4,5,6,7-tetrahydro-1,2-dimethyl-4-oxoindole, dimethylamine hydrochloride, and paraformaldehyde.

EXAMPLE 28

1-butyl-4,5,6,7-tetrahydro-2,3-dimethyl-5-dimethylaminomethyl-4-oxoindole

This compound is prepared in accordance with the method described in Example 6 from 1-butyl-4,5,6,7-tetrahydro-2,3-dimethyl-4-oxoindole, dimethylamine hydrochloride, and paraformaldehyde.

EXAMPLE 29

1-butyl-3-ethyl-4,5,6,7-tetrahyro-2-methyl-5-dimethylaminomethyl-4-oxoindole 1-butyl-3-ethyl-4,5,6,7-tetrahydro-2-methyl-4-oxoindole 11.65 g. (0.05 mole), 8.1 g. dimethylamine hydrochloride (0.1 mole), and 3 g. paraformaldehyde (0.1 mole) were refluxed for 3 days in 250 ml. of ethanol in a nitrogen atmosphere. The dark solution was evaporated to dryness in vacuo, the residue taken up in a mixture of 100 ml. water and 10 ml. 2 N HCl, extracted 3 times with 70 ml. portions of ether. The aqueous solution was freed from solvent by passing nitrogen through it and then made alkaline with ammonia water. A dark oil formed which could not be brought to crystallization nor purified by distillation. It was taken up in anhydrous ether and a hydrochloride formed by passing HCl gas through the solution. The hydrochloride separated as an oil which solidified on standing in the refrigerator. For purification it is dissolved in anhydrous ethanol, treated with decolorizing charcoal and crystallized by careful addition of anhydrous ether. After 3 crystallizations, colorless crystals were obtained, M.P. 68–72°.

EXAMPLE 30

3-ethyl-4,5,6,7-tetrahydro-1,2-dimethyl-5-piperidinomethyl-4-oxoindole

This compound is prepared in accordance with the method described in Example 6 from 3-ethyl-1,4,5,6,7-tetrahydro-1,2-dimethyl - 4 - oxoindole, piperidine hydrochlochloride, and paraformaldehyde.

EXAMPLE 31

2-ethyl-4,5,6,7-tetrahydro-3-methyl-5-dimethylaminomethyl-4-oxoindole

This compound is prepared in accordance with the method described in Example 6 from 2-ethyl-4,5,6,7-tetrahydro-3-methyl-4-oxoindole, dimethylamine hydrochloride, and paraformaldehyde.

EXAMPLE 32

4,5,6,7-tetrahydro-2-isoproply-3-methyl-5-dimethylaminomethyl-4-oxoindole

This compound is prepared in accordance with the method in Example 6 from 4,5,6,7-tetrahydro-2-isopropyl-3-methyl-4-oxoindole, dimethylamine hydrochloride, and paraformaldehyde.

EXAMPLE 33

4,5,6,7-tetrahydro-3-methyl-2-(2-methylpropyl)-5-dimethylaminomethyl-4-oxoindole This compound is prepared in accordance with the method described in Example 6 from 4,5,6,7-tetrahydro-3 - methyl - 2-(2 - methylpropyl)-4-oxindole, dimethylamine hydrochloride, and paraformaldehyde.

EXAMPLE 34

3-ethyl-4,5,6,7-tetrahydro-2-methyl-5-(2,6-dimethylmorpholino) methyl-4-oxoindole This compound is prepared in accordance with the method described in Example 6 from 3-ethyl-4,5,6,7-tetrahydro-2-methyl-4-oxoindole, 2,6-dimethylmorpholine hydrochloride, and paraformaldehyde; M.P. 160°.

EXAMPLE 35

4,5,6,7-tetrahydro-2,3,6-trimethyl-5-dimethylaminomethyl-4-oxoindole

This compound is prepared in accordance with the method described in Example 6 from 4,5,6,7-tetrahydro-2,3,6-trimethyl-4-oxoindole, dimethylamine hydrochloride, and paraformaldehyde.

EXAMPLE 36

4,5,6,7-tetrahydro-2,3-dimethyl-5-dimethylaminomethyl-4-oxo-1-phenylindole

Reaction of 4,5,6,7-tetrahydro-2,3-dimethyl-4-oxobenzofuran with aniline according to Stetter and Lauterbach (Ann. 655, 20, 1962) gave 4,5,6,7-tetrahydro-2,3-dimethyl-4-oxo-1-phenylindole. Reaction of the latter with dimethylamine hydrochloride and paraformaldehyde by the method described in Example 6 affords the title compound.

EXAMPLE 37

4,5,6,7-tetrahydro-2,3-dimethyl-5-dimethylaminomethyl-4-oxo-1-(2-pyridyl) indole Reaction of 4,5,6,7-tetrahydro-2,3-dimethyl-4-oxobenzofuran with 2-aminopyridine in accordance with the method of Example 37 gives 4,5,6,7-tetrahydro-2,3-dimethyl-4-oxo-1-(2-pyridyl)indole. This is condensed with dimethylamine hydrochloride and paraformaldehyde by the method described in Example 6 to give the title compound.

EXAMPLE 38

2-(3-methyl-2-butenyl)-4,5,6,7-tetrahydro-3-methyl-5-dimethyl-aminomethyl-4-oxoindole 2-methyl-2-hepten-6-one was isonitrosated and the resulting 5-oximino ketone reacted with 1,3-cyclohexanedione and zinc in acetic acid. 2-(3-methyl-2-butenyl)-4,5,6,7 - tetrahydro - 3-methyl-4-oxoindole was obtained. This was reacted with dimethylamine hydrochloride and paraformaldehyde according to Example 6 to give the title compound.

The active compounds of this invention may be taken in tablets or capsules in doses of 10–200 mg., in syrup at 2–20 mg./ml. concentration, in 10–200 mg. suppositories, or by parenteral injection in 10–50 mg./ml. concentration.

EXAMPLE 39

| Ingredient: | Mg./tablet |
|---|---|
| 3 - butyl - 4,5,6,7 - tetrahydro-2-methyl-5-piperidinomethyl-4-oxoindole | 100 |
| Lactose USP | 170 |
| Starch USP | 10 |
| Magnesium stearate USP | 1 |
| Stearic acid USP | 5 |
| Flavor q.s. | |

All above ingredients were passed through a 60-mesh sieve, blended for 30 minutes and compressed directly into tablets on a suitable tablet press at a weight of 206 mg., using a $^{11}\!/_{32}''$ biconcave, scored punch.

EXAMPLE 40

4,5,6,7-tetrahydro-2-methyl-5-morpholinomethyl-4-oxo-3-propyl-indole 4,5,6,7-tetrahydro-2-methyl-4-oxo-3-propyl-indole 15.2 gm. (0.08 mole), 14.8 gm. morpholine hydrochloride (0.12 mole), and 3.6 gm. paraformaldehyde (0.12 mole) were refluxed in 200 ml. ethanol for 40 hours. The solution was evaporated to dryness in vacuo on a steam bath and the residue digested with a mixture of 150 ml. water and 10 ml. 2 N HCl. An insoluble residue of unreacted starting material was filtered off. To the acid solution, ammonia water was added dropwise with stirring and the amine crystallied out. It was purified by dissolving in 1 N HCl and addition of ammonia, then by 2 crystallizations from benzene followed by 2 crystallizations from isopropanol, to yield the desired compound, M.P. 160–161°.

EXAMPLE 41

4,5,6,7-tetrahydro-2,3-dimethyl-5-morpholinomethyl-4-oxoindole 4,5,6,7-tetrahydro-2,3-dimethyl-4-oxoindole 15.2 gm. (0.08 mole), 14.8 gm. morpholine hydrochloride (0.12 mole), and 3.6 gm. paraformaldehyde (0.12 mole) were refluxed in 200 ml. ethanol for 40 hours. The solution was evaporated to dryness in vacuo on a steam bath and the residue digested with a mixture of 150 ml. water and 10 ml. 2 N HCl. An insoluble residue of unreacted starting material was filtered off. To the acid solution, ammonia water was added dropwise with stirring and the amine crystallized out. It was purified by dissolving in 1 N HCl and addition of ammonia, then by 2 crystallizations from benzene followed by 2 crystallizations from isopropanol, to yield the desired compound, M.P. 165–168°.

EXAMPLE 42

| Ingredient: | Mg./ml. |
|---|---|
| 4,5,6,7 - tetrahydro-2,3-dimethyl-5-(N'-hydroxyethylpiperazino)methyl - 4-oxoindole dihydrochloride | 50 |
| Sodium chloride q.s. for isotonicity. | |
| Methylparaben USP | 1.8 |
| Propylparaben USP | 0.2 |
| Water q.s. | |

EXAMPLE 43

| Ingredient: | Grams/liter |
|---|---|
| 4,5,6,7 - tetrahydro - 2,3 - dimethyl-5-dimethyl-aminomethyl-4-oxoindole hydrochloride | 10 |
| Granulated sugar | 600 |
| Flavor q.s. | |
| Color q.s. | |
| Sodium benzoate | 1 |
| Deionized water q.s. | |

All above ingredients were dissolved in water, combined and made up to a volume of one liter.

EXAMPLE 44

| Ingredient: | Mg./suppository |
|---|---|
| 4,5,6,7-tetrahydro-2-methyl-5-piperidinomethyl-4-oxo-3-propylindole | 100 |
| Cocoa butter q.s. | |

The drug and cocoa butter are combined, mixed thoroughly and formed into 2 gram suppositories.

The embodiments of the invention in which an exclusive privilege or property is claimed are defined as follows:

1. A compound selected from the group consisting of (A) bases having the formula:

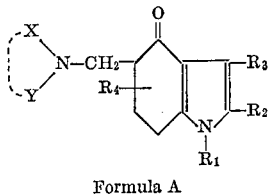

Formula A and, (B) salts of (A) with a pharmaceutically acceptable acid wherein:

$R_1$ designates a member selected from the group consisting of hydrogen, an alkyl group having up to 4 carbon atoms, benzyl, and phenyl;

$R_2$ and $R_3$ designate members selected from the group consisting of alkyl, and alkenyl each having up to 8 carbon atoms, or phenyl;

$R_4$ designates a member selected from the group consisting of hydrogen and alkyl having up to 4 carbon atoms;

X and Y designate a member selected from the group consisting of lower alkyl, hydroxy-lower alkyl, carbamoyloxy-lower alkyl, phenyl-lower alkyl, and together with the nitrogen atom to which they are attached, a heterocyclic unit selected from the group consisting of piperidino, (lower alkyl)-piperidino, di (lower alkyl)-piperidino, (lower alkoxy)-piperidino, hydroxy-piperidino, (lower alkanoyloxy)-piperidino, pyrrolidino, hydroxy-pyrrolidino, morpholino, (lower alkyl)-morpholino, di(lower alkyl)-morpholino, (lower alkoxy)-morpholino, thiomorpholino, (lower alkyl-thiomorpholino, di(lower alkyl)-thiomorpholino, (lower alkoxy)-thiomorpholino, piperazino, (lower alkyl)-piperazino, di(lower alkyl)-piperazino, (lower alkoxy)-piperazino, phenyl-piperazino, hydroxy-lower alkyl-piperazino, lower alkanoyloxy-(lower alkyl)-piperazino, and carbamoyloxy-lower alkyl-piperazino, the term "lower" designating a radical having 1 to 5 carbon atoms.

2. A compound according to claim 1, in which said base is a 5-(heterocyclo amino) methyl-2,3-dilower alkyl-4,5,6,7-tetrahydro-4-oxoindole.

3. A compound of claim 2, in which said base is 5-dimethylaminomethyl-2-methyl-3-ethyl-4,5,6,7-tetrahydro-4-oxoindole.

4. A compound of claim 2, in which said base is 3-butyl - 5 - dimethylaminomethyl-2-methyl-4,5,6,7-tetrahydro-4-oxoindole.

5. A compound of claim 2, in which said base is 4,5,6,7-tetrahydro - 2 - methyl-5-dimethylaminomethyl-4-oxo-3-phenylindole.

6. A compound of claim 2, in which said base is 4,5,6,7-etrahydro - 1,2,3-trimethyl-5-dimethylaminomethyl-4-oxoindole.

7. A compound of claim 3, in which said base is 3-ethyl-4,5,6,7 - tetrahydro - 2 - methyl - 5 - piperidinomethyl-4-oxoindole.

8. A compound of claim 3, in which said base is 3-ethyl-5 - piperidinomethyl - 1,2 - dimethyl-4,5,6,7-tetrahydro-4-oxoindole.

9. A compound of claim 3, in which said base is 4,5,6,7-tetrahydro - 2,3 - dimethyl-5-morpholino-methyl-4-oxoindole.

10. A compound of claim 3, in which said base is 4,5,6,7 - tetrahydro - 2-methyl-5-morpholinomethyl-4-oxo-3-propyl-indole.

11. A compound of claim 2, in which said base is 3-ethyl-6,7-dihydro-2-methyl-5-(morpholinomethyl) indol-4(5H)-one.

No references cited.

ALEX MAZEL, Primary Examiner

JOSE TOVAR, Assistant Examiner

U.S. Cl. X.R.

26—326.15, 247.1, 294.7, 293.4, 268, 243, 326.12, 294, 247.2, 326.14; 424—246, 248, 274, 267, 250

PO-1050
(5/69)

UNITED STATES PATENT OFFICE
CERTIFICATE OF CORRECTION

Patent No. 3,491,093      Dated January 20, 1970

Inventor(s) Irwin J. Pachter and Karl Schoen    PAGE - 1

It is certified that error appears in the above-identified patent and that said Letters Patent are hereby corrected as shown below:

Column 2, line 42, "($R_1$B(B" should read -- ($R_1$B, B --

Column 4, line 8, "writing" should read -- writhing -- line 53, "propionoxy" should read -- propionyloxy -- and "butyroxy" should read -- butyroyloxy -- line 54, "valeroxy" should read -- valeroyloxy line 60, after "lower alkanoyloxy" insert a parenthesis [)]

line 61, after "pyrrolidino" (at the end of the line) insert a comma [,]

line 64, after thiomorpholino" insert a comma [

Column 9, line 59, "dimehyl" should read -- dimethyl --

Column 10, line 29, "Piperidinomethyl-4-oroindole" should read -- piperidinomethyl-4-oxoindole -- line 39, "compoond" should read -- compound --

Column 11, line 5, "3-ethyl-1,4,5,6,7-" should read -- 3-ethyl-4,5,6,7- -- line 23, after "method" insert -- described --

Column 12, line 44, "crystallied" should read -- crystallized --

Column 14, line 6, after "alkyl" insert a parenthesis [)]

3,491,093

(2)

line 27, "etrahydro" should read -- tetrahydro -- lines 17, 20, 23 and 26, the claim reference numeral "2", each occurrence, should read -- 1 -- lines 29, 32, 35, 38, the claim reference numeral "3", each occurrence, should read -- 2 -- line 15, "5-(heterocyclo amino) methyl" should read -- 5-(heterocyclo amino)methyl- -- line 36, "5-morpholino-methyl-" should read -- 5-morpholinomethyl- -- line 42, "5-(morpholinomethyl) indol-" should read -- 5-(morpholinomethyl)indol- --

Signed and sealed this 15th day of September 1970.

(SEAL)
Attest:

EDWARD M. FLETCHER, JR.      WILLIAM E. SCHUYLER, JR.
Attesting Officer         Commissioner of Patents